Oct. 5, 1971   R. M. TUCK   3,610,071
TRANSMISSION
Filed May 6, 1970
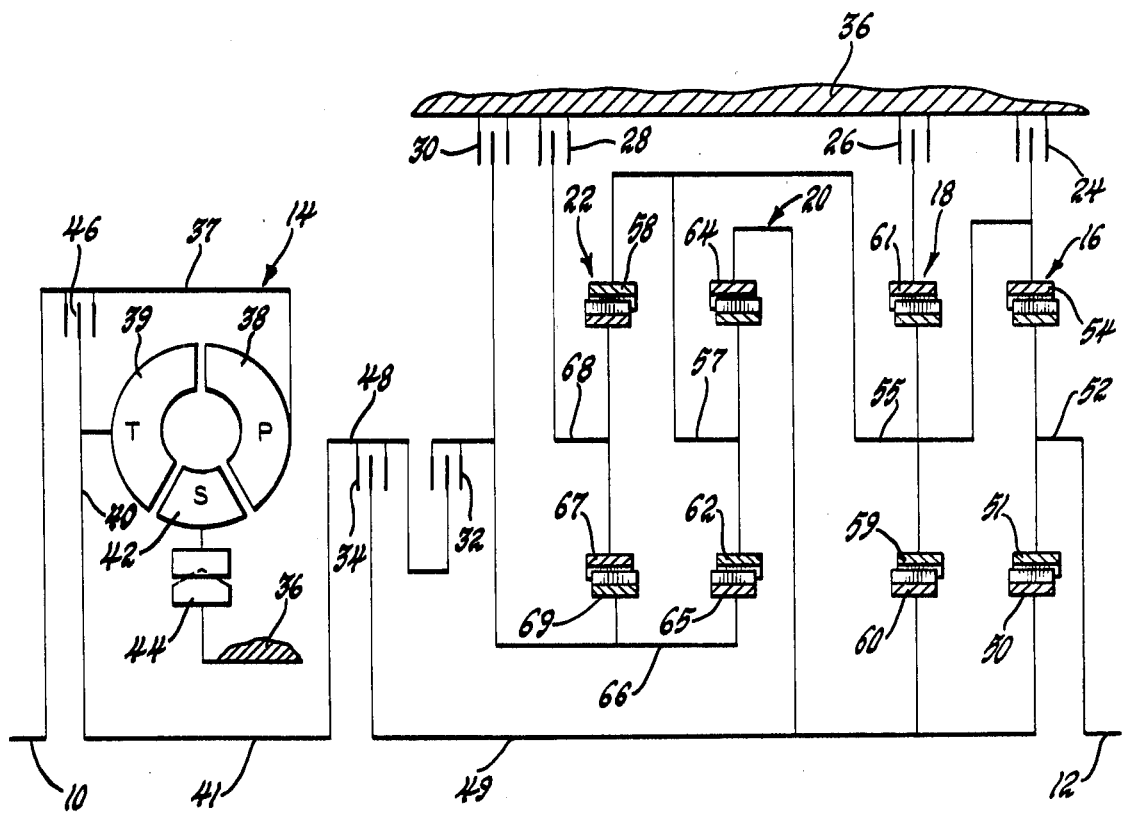
INVENTOR.
Robert M. Tuck
BY
Ronald L. Phillips
ATTORNEY

United States Patent Office 3,610,071
Patented Oct. 5, 1971

3,610,071
TRANSMISSION
Robert M. Tuck, Indianapolis, Ind., assignor to General Motors Corporation, Detroit, Mich.
Filed May 6, 1970, Ser. No. 35,009
Int. Cl. F16h *57/10, 5/10*
U.S. Cl. 74—759
2 Claims

ABSTRACT OF THE DISCLOSURE

A transmission having four planetary gear sets and six friction drive establishing devices combined to provide at least five forward speed range drives and a reverse drive with the lowest forward speed range drive being provided by only one of the gear sets and the remaining forward drives provided by this one gear set combining input drive with four different speed ratio drives from the remaining gear sets. Sequential upshifting and downshifting is provided by releasing only one friction drive establishing device and engaging only one other friction drive establishing device.

---

This invention relates to transmissions and more particularly to transmissions with limited duty requirements on certain gearing therein.

The transmission according to the present invention comprises a hydrodynamic torque converter that provides input to a gear train arrangement comprising four planetary gear sets and six friction drive establishing devices that are combined to provide at least five forward speed range drives and a reverse drive. The first and lowest forward speed range drive is provided by only one of the gear sets which has a torque capacity larger than the remaining gear sets and the remaining forward drives are provided by this one gear set combining four different speed ratio drives provided by the remaining gear sets. Only two friction drive establishing devices are engaged to establish each drive and sequential upshifting and downshifting in the forward drives is provided by releasing only one drive establishing device and engaging only one other drive establishing device. Thus, only one gear set need have heavy duty capacity and furthermore, the transmission is simply controllable.

An object of the present invention is to provide a new and improved transmission.

Another object is to provide in a transmission the combination of four planetary gear sets and six drive establishing devices that are combined to provide at least five forward speed range drives and a reverse drive and wherein the heaviest duty requirements are on only one gear set.

Another object is to provide in a transmission the combination of four planetary gear sets and six friction drive establishing devices to provide at least five forward speed range drives and a reverse drive with sequential upshifting and downshifting in the forward drives accomplished by releasing only one drive establishing device and engaging only one other drive establishing device.

These and other objects of the present invention will be more apparent from the following description and drawing of an embodiment of the invention.

The drawing diagrammatically shows an embodiment of the transmission according to the present invention.

Referring to the drawing there is shown a vehicular transmission generally comprising a transmission input shaft 10 that is selectively drivingly connected to a transmission output shaft 12 by a hydrodynamic torque converter 14, four planetary gear sets 16, 18, 20 and 22 and six friction drive establishing devices 24, 26, 28, 30, 32 and 34. All of these components are suitably supported in a transmission housing generally designated as 36 with the input shaft 10 being adapted for connection to an engine and the output shaft 12 being adapted for connection by a final drive train to the vehicle's driving wheels. The four gear sets and six friction drive establishing devices offer at least five forward speed range drives and one reverse drive.

Power input to the transmission is delivered by input shaft 10 to the torque converter's housing 37 to which the converter's pump blades 38 (P) are connected. The pump blades 38 pump fluid to the converter's turbine blades 39 (T) which are connected by a hub 40 to the converter's output shaft 41 which serves as the input shaft to the transmission's gearing. Fluid leaving the turbine blades 39 is redirected to the pump blades 38 by stator blades 42 (S) which are connected by one-way brake 44 to the transmission housing 36. The torque converter is a conventional three element type which multiplies torque with the torque gradually decreasing from stall with increasing engine speed until the turbine obtains a speed close to pump speed. At this point which corresponds to the coupling speed, there is no reaction at the stator and the stator is free to rotate in the forward direction which is the same direction as the pump and turbine since the one-way brake 44 prevents only reverse rotation of the stator. The converter 14 further includes a conventional friction plate type lockup clutch 46 which on engagement connects the converter housing 37 to the hub 40 to thus provide a direct mechanical drive between the input shaft 10 and gearing input shaft 41 which drive bypasses the hydraulic power path through the converter.

Power input to the transmission's gearing is provided by the gearing input shaft 41 which is connected to a drum 48. Drum 48 is connected by engagement of the friction drive establishing device 34 to a shaft 49, the friction drive establishing device 34 being a conventional friction plate type clutch. Shaft 49 is connected to sun gear 50 in gear set 16. Sun gear 50 meshes with pinions 51 which are carried by a carrier 52 that is connected to transmission output shaft 12. Pinions 51 also mesh with a ring gear 54 which may be held by engagement of the friction drive establishing device 24 which is a conventional friction plate type brake. One member of each of the gear sets is connected to one member of every other gear set in that the ring gear 54 in gear set 16, carrier 55 in gear set 18, carrier 57 in gear set 20, and ring gear 58 in gear set 22 are all interconnected. In gear set 18, pinions 59 carried by carrier 55 mesh with a sun gear 60 which is connected to shaft 49. Pinions 59 also mesh with a ring gear 61 which may be held by engagement of friction drive establishing device 26 which is a conventional friction plate type brake. In gear set 20, pinions 62 carried by carrier 57 mesh with a ring gear 64 which is connected to shaft 49. Pinions 62 also mesh wth a sun gear 65 which is connected to a sleeve shaft 66 through which shaft 49 extends. In gear set 22, ring gear 58 meshes with pinions 67 carried by a carrier 68 which may be held by engagement of the friction drive establishing device 28 which is a conventional friction plate type brake. Pinions 67 also mesh with a sun gear 69 which is connected to sleeve shaft 66. Sleeve shaft 66 and thus sun gears 65 and 69 may be held by engagement of the friction drive establishing device 30 which is a conventional friction plate type brake. Both sun gears 65 and 69 may also be connected to the gearing input shaft 41 by engagement of the friction drive establishing device 32 which is a conventional friction plate type clutch.

The brakes and clutches employed in the transmission may be actuated in any known way, e.g. electrically, hydraulically, pneumatically or by some mechanical provision and in a certain sequence. An operational sequence providing five forward speed range drives and one or more reverse drives will be described in the following operational summary.

The first forward speed range drive and the one considered the lowest, provides the greatest torque multiplication available in this drive train arrangement for high starting effort and occurs when both the clutch 34 and brake 24 are engaged. Then with the gearing input shaft 41 and thus sun gear 50 being driven forwardly by the torque converter 14, there is effected forward drive of the carrier 52 and thus of the output shaft 12 at a reduced speed relative to gearing input shaft 41, the gear set 16 thus providing a simple planetary reduction gear ratio with the braked ring gear 54 providing reaction.

In the remaining four forward speed range drives, the planetary gear set 16 continues to have its sun gear 60 driven forwardly at the speed of gearing input shaft 41 and in addition, the ring gear 54 is driven forwardly at progressively increasing speed by drives from the remaining gear sets. Thus, the gear set 16 acts as a power combiner in all of the remaining drives. To establish the second forward speed range drive, the brake 24 is disengaged and brake 26 is engaged while clutch 34 remains engaged. With ring gear 61 in gear set 18 thus held to provide reaction and with the forwardly rotating sun gear 60 in this gear set, the carrier 55 is driven in the forward direction and at a reduced speed relative to gearing input shaft 41. Thus, the ring gear 54 in gear set 16 which is connected to the carrier 55 in gear set 18 is driven in the forward direction and at a reduced speed relative to the forwardly rotating sun gear 50. The forward speed component of ring gear 54 adds to that of sun gear 50 to drive the carrier 52 and thus the transmission output shaft 12 in a speed range higher than that obtainable in the first forward speed range drive and by the compound action thus provided by gear sets 16 and 18.

The third forward speed range drive is provided by disengaging brake 26 and engaging brake 28 while clutch 34 remains engaged. This effects a compound reduction gear ratio drive in gear sets 20 and 22 between gearing input shaft 41 and the ring gear 54 in gear set 16 to drive the ring gear 54 in the forward direction and in a speed range higher than that made available in the second forward speed range drive while the planetary gear set 18 merely idles and carries no load. Since the sun gear 50 continues to be driven in the forward direction, the transmission output shaft 12 is thus driven in a speed range higher than that made available in the second speed range forward drive.

The fourth forward speed range drive is established by releasing brake 28 and engaging brake 30 while clutch 34 remains engaged. Then the planetary gear set 20 provides a simple planetary reduction gear ratio drive between the gearing input shaft 41 and the ring gear 54 in gear set 16 to drive ring gear 54 in a speed range higher than that made available in the third forward speed range drive. Thus, the transmission output shaft 12 is driven in a higher speed range than that made available in the third speed range forward drive with the continued forward drive of sun gear 50.

The fifth forward speed range drive is established by releasing brake 30 and engaging clutch 32 while clutch 34 remains engaged. With both clutches 34 and 32 engaged, all of the planetary gear sets 16, 18, 20 and 22 are in a locked up condition thus providing a direct drive from gearing input shaft 41 to the transmission output shaft 12 to effect the highest speed of the transmission output.

The operation thus far described illustrates sequential upshifting and it will be understood that reversing the sequence of operation provides downshifting. It will furthermore be appreciated that the sequential upshifting and downshifting is accomplished by releasing only one friction drive establishing device and engaging only one other friction drive establishing device.

A first reverse speed range drive is established by engaging clutch 32 and brake 26. This effects a compound reverse reduction gear ratio drive in gear sets 16, 18 and 20 between the gearing input shaft 41 and transmission output shaft 12. A second and lower speed range drive in reverse providing greater torque multiplication is also available. The latter reverse drive is established by engaging clutch 32 and brake 24 whereby gear set 20 then provides a reverse gear reduction drive between gearing input shaft 41 and sun gear 50 in gear set 16 and the latter gear set provides simple planetary reduction gear drive to output shaft 12.

To illustrate the gear ratios and the steps between ratios that are made available by the above described transmission gearing arrangement, typical gear tooth numbers will now be assigned. In gear set 16 the sun gear 50 is assigned 30 teeth and ring gear 54 assigned 90 teeth. In gear set 18 the sun gear 60 is assigned 26 teeth and ring gear 61 is assigned 70 teeth. In gear set 20 the sun gear 65 is assigned 40 teeth and ring gear 64 is assigned 80 teeth. In gear set 22 the sun gear 69 is assigned 48 teeth and ring gear 58 is assigned 80 teeth. With these particular gear sizes, the first forward drive has a gear ratio of 4.000:1, the second forward drive has a gear ratio of 2.207:1, the third forward drive has a gear ratio of 1.750:1, the fourth forward drive has a gear ratio of 1.333:1, the fifth forward drive has a gear ratio of 1.000:1, the first reverse drive has a gear ratio of $-2.621:1$ and the second reverse drive has a gear ratio of $-8.000:1$. The drive ratio step pattern is determined by dividing the succeeding higher drive ratio desired to be engaged into the immediately preceding lower drive ratio that is to be disengaged and with the drive ratios provided above and provided that no available drive ratios are to be bypassed while accelerating the load in forward drive, the step between the first and second forward speed range drives is 1.812 and is the largest ratio step, the step between the second and third forward speed range drives is 1.261, the step between the third and fourth forward speed range drives is 1.313, and the step between the fourth and fifth forward speed range drives is 1.333. With such gear ratios and step pattern, this transmission arrangement with these gear sizes is particularly suitable for use as a heavy truck transmission wherein it is desirable to provide high torque multiplication for large starting effort in the lowest forward drive and relatively even and small ratio steps between succeeding drive ranges for accelerating the load without large changes in engine speed to reduce shift shock and to keep engine power at a maximum as much as possible.

The above described embodiment is illustrative of the invention which may be modified within the scope of the appended claims.

I claim:

1. In a transmission the combination of an input shaft; an output shaft; first, second, third and fourth planetary gears sets each having a sun gear member, a ring gear member and a carrier member carrying a pinion meshing with the sun gear member and the ring gear member; a first clutch for selectively connecting said input shaft to one member in said first, second and third gear sets; a second clutch for selectively connecting said input shaft to one member in said fourth gear set and another member in said third gear set; another member in said first gear set connected to said output shaft; the third member in said first gear set, another member in said second gear set, the third member in said third gear set and another member in said fourth gear set all being interconnected; a first brake for selectively braking said third member in said first gear set; a second brake for selectively braking the third member in said second gear set; a third brake for selectively braking the third member in said fourth gear set; and a fourth brake for selectively braking said another member in said third gear set and the said one member in said fourth gear set whereby there is provided between said input shaft and said output shaft a first forward speed range drive on engagement of said first clutch and said first brake, a second forward speed range drive on engagement of said first clutch and said second brake, a third forward speed range drive on engagement of said first clutch and said third brake, a fourth forward speed range drive on engagement of said first clutch and said fourth brake, a fifth forward speed range drive on engagement of said first clutch and said second clutch and a reverse drive on engagement of said second clutch and said second brake.

2. In a transmission the combination of an input shaft; an output shaft; first, second, third and fourth planetary gear sets each having a sun gear, a ring gear and a carrier carrying a pinion meshing with the sun gear and the ring gear; a clutch for selectively connecting said input shaft to the sun gear in said first gear set, the sun gear in said second gear set and the ring gear in said third gear set; the carrier in said first gear set connected to said output shaft; the ring gear in said first gear set, the carrier in said second gear set, the carrier in said third gear set and the ring gear in said fourth gear set all being interconnected; a brake for selectively braking the ring gear in said first gear set; a brake for selectively braking the ring gear in said second gear set; a brake for selectively braking the carrier in said fourth gear set; a brake for selectively braking the sun gear in said third gear set and the sun gear in said fourth gear set; and a clutch for selectively connecting said input shaft to the sun gear in said third gear set and the sun gear in said fourth gear set.

References Cited

UNITED STATES PATENTS

| | | | |
|---|---|---|---|
| 2,518,824 | 8/1950 | Simpson | 74—763 |
| 3,067,632 | 12/1962 | Foerster et al. | 74—759 |
| 3,267,769 | 8/1966 | Tuck et al. | 74—682 X |
| 3,398,606 | 8/1968 | Utter | 74—759 |

FOREIGN PATENTS

| | | | |
|---|---|---|---|
| 743,814 | 1/1956 | Great Britain | 74—759 |

CARLTON R. CROYLE, Primary Examiner

T. C. PERRY, Assistant Examiner

U.S. Cl. X.R.

74—682